United States Patent
Ludwig et al.

(10) Patent No.: US 6,752,258 B2
(45) Date of Patent: Jun. 22, 2004

(54) CONVEYING DEVICE COMPRISING A PACKAGES CARRIER

(75) Inventors: Werner Ludwig, Darmstadt-Wixhausen (DE); Josef Stannek, Pfungstadt (DE)

(73) Assignee: Tetra Laval Holdings & Finance S.A. (CH)

( * ) Notice: Subject to any disclaimer, the term of this patent is extended or adjusted under 35 U.S.C. 154(b) by 0 days.

(21) Appl. No.: 10/240,864

(22) PCT Filed: Mar. 30, 2001

(86) PCT No.: PCT/EP01/03673
§ 371 (c)(1),
(2), (4) Date: Jan. 17, 2003

(87) PCT Pub. No.: WO01/74691
PCT Pub. Date: Oct. 11, 2001

(65) Prior Publication Data
US 2003/0152444 A1 Aug. 14, 2003

(30) Foreign Application Priority Data
Apr. 4, 2000 (DE) .......................... 100 16 631

(51) Int. Cl.[7] ............................................. B65G 37/00
(52) U.S. Cl. ................. 198/465.3; 198/463.1; 198/803.2; 198/463.3
(58) Field of Search ........................ 198/465.3, 463.1, 198/803.2, 463.3

(56) References Cited

U.S. PATENT DOCUMENTS

| | | | | |
|---|---|---|---|---|
| 3,272,240 A | | 9/1966 | Roth | |
| 3,779,361 A | * | 12/1973 | Schmitt | 198/468.1 |
| 4,352,423 A | * | 10/1982 | Santen | 414/421 |
| 4,633,998 A | * | 1/1987 | Norfolk | 198/465.3 |
| 4,934,507 A | * | 6/1990 | Blocker | 198/346.2 |
| 5,473,978 A | * | 12/1995 | Colombo | 99/443 C |
| 5,922,230 A | * | 7/1999 | Yokota | 219/388 |
| 6,220,420 B1 | * | 4/2001 | Jan et al. | 198/369.1 |

FOREIGN PATENT DOCUMENTS

| | | |
|---|---|---|
| DE | 197 39 326 | 4/1999 |
| DE | 298 21 746 | 5/2000 |

* cited by examiner

Primary Examiner—Richard Ridley
(74) Attorney, Agent, or Firm—Michael L Dunn (57) ABSTRACT

Disclosed is a device for intermittently conveying packages which are conveyed in a first moving direction in package carriers (2) in a first processing plane in positions underneath various treatment stations and are conveyed back in a second return motion plane in a second moving direction that is parallel in relation to the first moving direction, whereby a conveying cycle is formed. The aim of the invention is to enable such a device to be efficient, compact and be operated using simple devices. According to the invention, the respectively superimposed ends of the essentially horizontal first conveyor (19) in the first processing plane and of the essentially horizontal third conveyor (12) in the second return motion plane are connected to one another for forming the conveying cycle by means of vertically acting second and fourth lifting conveyors (9, 15). Each conveyor (9, 19, 12, 15) has a separate drive (22–24). A third loading plane is arranged between the first processing plane and the second return motion plane. The three planes are arranged in an essentially horizontal manner. Each package carrier (2) is constructed in an even manner and is held in a horizontal position by means of the conveyor cycle. Means for loading and unloading the packages into and/or from the package carriers (2) are provided in the region of the third loading plane in a loading direction which is parallel in relation to the first moving direction of the packages.

24 Claims, 6 Drawing Sheets

CONVEYING DEVICE COMPRISING A PACKAGES CARRIER

The invention concerns an apparatus for intermittently conveying packages which are conveyed in a first travel direction in package carriers on a first process plane in positions beneath various treatment stations and on a second return plane in a second travel direction parallel to the first travel direction, forming a conveyor circuit.

For producing and in particular finishing packages, in known machines they are held in workpiece carriers and intermittently fed by means of endlessly circulating conveyor belts to individual treatment stations in which the respective package for example is filled after having been folded into the finished condition, and finally closed. The conveyor belts pass around two direction-changing guide rollers, wherein the workpiece carriers are turned in the conveyor arcs thereof from a vertical orientation into a horizontal one and then again into a vertical orientation. The vertical orientation is that for the process plane because conveyors of that kind are frequently used in relation to the packaging of liquid foodstuffs which are introduced from above into the package which is disposed therebeneath and which is open upwardly. In many conveyors, the workpiece carriers are rigidly interlinked, for example by way of roller chains or link chains. This is found to suffer from the disadvantage that after prolonged operation there are undesirable increases in the length of the chains, with the consequence of inaccurate positioning under the respective treatment station. If there a wish to use such conveyors in the foodstuffs industry sterile packaging is frequently required and when using roller or link chains movable parts have to be lubricated so that such conveyors cannot operate in clean room conditions where however the operation of filling the packages is carried out.

Admittedly, operators have already changed over to using toothed belts in order to avoid lubrication and to have a smaller increase in length. However, separating off the package carriers, for example for the purposes of better sterilization, and subsequent refitment, are practically impossible. In addition, when using toothed belts there is often a limited level of resistance to thermal and chemical influences in the environment.

In order to increase the machine output of packaging machines and there in particular filling devices, that is to say in order to be able to process a larger number of packages in a machine per unit of time, a plurality of package carriers have been arranged in mutually juxtaposed relationship along the process plane, the package carriers therefore being arranged in mutually juxtaposed relationship transversely with respect to the first travel direction. If the endless conveyors of the known kind can be used at all for multiplication in respect of width, the width of such a process plane however, at least for static reasons, is subject to limits which do not permit a further increase in output.

Therefore the object of the invention is to provide a conveyor apparatus for packages of the kind set forth in greater detail in the opening part of this specification, which while being of a compact structure permits a high output and operation with simple devices.

In accordance with the invention that object is attained in that the respective mutually superposed ends of the substantially horizontally extending first conveyor in the first process plane and the substantially horizontally extending second conveyor in the second return plane are interconnected to form the conveyor circuit by substantially vertically operating second and fourth lift conveyors, that each conveyor has a separate drive, that arranged between the first process plane and the second return plane is a third loading plane, the three planes are substantially horizontally arranged, each package carrier is of a substantially flat structure which is held in a substantially horizontal position over the conveyor circuit and that provided in the region of the third loading plane are means for loading and unloading the packages into and/or out of the package carriers in a loading direction which is parallel to the first travel direction of the packages.

It is firstly possible to explain the conveyor apparatus according to the invention by means of a simple conveyor picture which shows a rectangular conveyor path with a first travel direction at the top on a first process plane which is adjoined at the end of that plane by a lift conveyor in order to convey the package carriers out of the first process plane downwardly into the second return plane; that is then followed by the substantially horizontally extending third conveyor in the second return plane, in which respect here the travel direction is parallel but opposite to that of the first process plane, and the conveyor circuit is closed by a so-called fourth lift conveyor which lifts the package carriers from the lower second return plane into the upper first process plane. If that rectangular path is viewed in the clockwise direction, then the package carriers are moved in the first process plane from left to right by the first conveyor, at the end they are lowered vertically downwardly by the second lift conveyor into the second return plane, there they are moved horizontally towards the left by the third conveyor so that the fourth lift conveyor can then again vertically lift the package carriers upwardly into the initial position into the first process plane. Different travel patterns can be set by virtue of the respectively separate drives for each of the conveyors. In addition it is possible to adopt very simple drives and the drives can be caused to operate at different speeds, in accordance with the respective control thereof, in such a way that for example a large number of package carriers is present in the entire conveyor circuit only on one of the horizontal planes, while in the other three conveyors only few to no package carriers are being moved. It is possible in that way to save on package carriers, simplify operation, for example afford excellent cleaning possibilities, and nonetheless predetermine a high level of output. The most slowly operating station predetermines the time cycle for intermittent conveyance of the packaging carriers.

The advantageously compact structure of the conveyor apparatus is not subjected to any limitation if the above-mentioned third loading plane is disposed between the first process plane and the second return plane. However by virtue of the arrangement of that loading plane, it is possible to considerably increase the output of the conveyor apparatus in that the loading and unloading operation can be accelerated to a surprisingly great degree, which was not possible in the case of the previous conveyors with the feed at the entry to the process plane being vertically downwardly. The overall structure is simplified by virtue of the fact that the three planes described are arranged substantially horizontally. In a preferred embodiment the length of the conveyor is determined by the various, successively arranged treatment stations or the overall length required for same. The height of the conveyor apparatus of compact structure is kept low and operation is speeded up and simplified because each substantially flat package carrier is always held horizontally, including in the vertically operating second and fourth lift conveyors. More specifically the loading and unloading means can then withdraw finished packages from the package carriers and introduce empty packages into the package carriers at the loading position, with a high level of acceleration and over short distances, in which respect that can be effected at the same time for a multiplicity of packages if the package carriers accommodate a plurality of packages.

The foregoing measures show how a very powerful conveyor can nonetheless be of a very compact structure and permits the use of simple devices for operation thereof, for example for the loading operation, for varying the travel direction, although or precisely because no arcuately guided route has to be followed or also there is not an arcuately guided portion of conveyor bodies that has to be moved.

In a further advantageous configuration of the invention the total conveyor time of the lift conveyor is substantially equal to the cycle time of the first conveyor in the first process plane and the time for loading or unloading is approximately equal to the transport time within the cycle time of the first conveyor. The intermittent movement of the first conveyor is effected in cycles each with a respective given cycle time. The duration of that cycle time is equal to the sum of the transport time plus the hold time. This means in other words that in one cycle a package carrier on the one hand is transported to a given treatment station (transport time) and on the other hand is additionally thereafter stopped until the treatment is concluded (hold time). The cycle time has expired, after the expiry of those two periods of time. The first conveyor in the first process plane has comparatively short transport times in relation to the hold times. The package carrier can therefore be transported to the new treatment station in a shorter time than the time required to conclude the treatment. If in a preferred embodiment the cycle time is six seconds, then the hold time can be set to five seconds and the transport time to one second. In accordance with the invention the conditions are correspondingly reversed in the lift conveyor. The time which is necessary to carry out the entire transportation procedure of the lift conveyor, that is to say the time for the movement and for the loading procedure (loading or unloading) is approximately as long as the cycle time of the first conveyor. Of that total cycle time the time for loading and unloading the lift conveyor represents only a fraction. The time for loading and unloading the lift conveyor is approximately equal to or less than the transport time of the first conveyor; in the above-indicated example therefore only about one second is needed for loading or unloading. That surprisingly short time is only possible because there is the separate third loading plane for the loading and unloading operations, the third loading plane being horizontal like the other two planes (process plane, return plane). Added to that is the fact that the loading and unloading means involve an operating direction which is parallel to the first travel direction of the packages. If the lift conveyor operates vertically then loading and unloading are effected in a horizontal direction. In the loading operation for example pushers only need to push the treated packages out of the package carriers and a short period of time is sufficient for that. A specific embodiment of a preferred machine with a particular conveyor apparatus according to the invention permitted loading and unloading of 1 liter packages in 0.8 seconds, and in another type of machine 0.5 seconds. No previously known machine permitted loading or unloading of a conveyor in such a short time.

It is further desirable in accordance with the invention if the package carrier has on two diametrally opposite sides U-shaped, outwardly open recesses which are oriented in the first travel direction of the first conveyor. A vertical axis can be envisaged in the center of a U. If an inverted further U is arranged at a spacing under that first U oriented in such a way that both central axes fall onto one line, then that gives the above-described orientation of the two recesses. In accordance therewith the invention also provides the teaching that said central line of the two U-shaped recesses which are arranged in mutually opposite relationship is parallel to the first travel direction. The orientation of those recesses has a particularly advantageous effect in the third loading plane in the loading and unloading operations. In the unloading procedure the one package is pushed or pulled out of the recess which is open outwardly in the conveyor direction, with that direction of movement being for example the same as that of the first travel direction. The other oppositely disposed package is then moved out in the opposite direction. Both are effected at the same time and require only little time. The other advantage of the two recesses is that in that way the package carrier has double the capacity. The man skilled in the art knows that the width of a machine and also a conveyor apparatus cannot be increased just as maybe desired because strength conditions impose a limit in terms of increasing the width of a package carrier. By virtue of the arrangement of two recesses which are oriented relative to each other, it is possible to hold, transport, load and unload two packages on this path, instead of one.

It is further desirable in accordance with the invention if the package carrier is in the configuration of an elongate bar extending transversely with respect to the first travel direction, in such a way that the recesses come to lie in pairs in mutually juxtaposed relationship. Besides the above-mentioned doubling of the capacity of a package carrier from one to two packages, the enlargement in capacity in a transverse direction is possible to a certain extent as is permitted by strength conditions. For that purpose the package carrier can be designed in a bar or plate form and the recesses can be arranged in paired mutually juxtaposed relationship. The loading and unloading devices which operate in the third loading plane can then move all mutually juxtaposed packages in a bar out or in at once. The capacity of such a conveyor apparatus is thereby considerably increased.

It is also advantageous in accordance with the invention if the package carrier for holding bottles is a bar-shaped metal sheet with pairs, arranged in mutually juxtaposed relationship transversely with respect to the first travel direction, of U-shaped recesses which face away from each other and the width of which corresponds to the outside diameter of the bottle neck. A desirable area of use of the conveyor apparatus according to the invention is receiving, holding and transporting upwardly open bottles which are preferably made from plastic material. The width of the respective U-shaped recess then approximately corresponds to the outside diameter of the bottle neck in question. It will be appreciated that a bottle then only needs to be pushed from the outside into the bottom of the U-shape in order to provide a good hold for the bottle there. Unloading is conversely equally expedient. The production of such a package carrier is inexpensive and technically surprisingly simple. A metal sheet or bar of a suitable configuration with double walls and stiffening rails can be easily produced and does not require any maintenance whatsoever apart from cleaning. Such a package carrier can be used in the above-described devices and transported over the various conveyor paths. Carriers, supports and rails mounted thereto can be provided at the narrow ends of a preferably bar-shaped sheet member so that the package carriers are supported with simple means along the first process plane and also along the second return plane and are preferably displaced with a sliding motion on support rails.

In that respect in accordance with the invention it is particularly advantageous if the drive device of the first conveyor in the first process plane has at least one thrust rod which extends in the first travel direction and which is pivotable and which can be pushed forward and back in the first travel direction and in the opposite direction thereto and on which are fixed at a spacing from each other advance projections which can be brought into engagement with locking grooves on the package carrier. It is precisely in the first process plane in which the packages have to be treated and transported in a hygienic fashion because inter alia this involves filling of the package, that simple and robust motion means should guarantee a reliable advance movement. The at least one thrust rod is such a conveyor means. Fixed to the thrust rod at a spacing from each other are advance projections which for example all protrude in a first direction radially from the thrust rod. If the thrust rod is pivoted about its own axis, those advance projections can then be pivoted from a rest position into such a position in which the advance projections engage into locking grooves on the package carrier, the locking grooves being arranged in just fitting oppositely disposed relationship. When then the thrust rod is moved a distance in the direction of its longitudinal direction, the package carrier is then also moved by the same amount. If thereafter the thrust rod is again pivoted through an angle which can be for example 90° or 180°, the locking grooves then release the package carriers. The thrust rod can move back to the next package carriers, come into engagement therewith and then also push them on. When a plurality of advance projections are fixed to the thrust rod, then a plurality of package carriers can be moved at the same time. In the case of wider conveyor apparatuses, it is desirable in accordance with the invention to provide on each side, that is to say at the two oppositely disposed ends (wide sides) of the package carrier, a respective rod, that is to say in total two thrust rods in the apparatus. It is desirable if a single motor provides a synchronous for both thrust rods. One motor can provide for example for longitudinal displacement and the other for pivotal movement.

In the case of high-output machines each treatment station has a dual row of treatment devices which are arranged in transversely mutually juxtaposed relationship. If then for example a flushing operation is carried out on the interior of the package in one station, then the flushing operation is effected simultaneously for two (or a multiple of two) packages. If in the next treatment station the flushing substance is removed by drying, then two respective drying devices respectively provide for drying out the interior of the packages simultaneously in the next treatment station. This time-saving design configuration of the overall conveyor and filling machine involves double the number of tools in each treatment station. In the case of nozzles or the like this does not involve a high level of costs. If however consideration is given to the procedure for sealing and closing a package, the devices involved are nonetheless quite expensive if precise and in addition possibly also sterile sealing has to be effected. It would then be desirable and possible to provide only one row of sealing stations when the package carrier is firstly moved with the respective leading packages in the leading recesses into position under the sealing stations and thereafter the respective next packages in the trailing recesses of the same package carrier are moved into position under the same sealing stations. This means however that the conveyor apparatus must be capable of conveying the package carrier only by half a cycle distance. That is possible from the point of view of time, that is to say treatment in half the cycle time is possible, for the sealing operation is effected must faster than the operation of filling the package with a liquid.

Therefore according to the invention a particularly preferred embodiment is characterized in that fixed between two advance projections which project radially in the same direction from the thrust rod is an intermediate stroke projection projecting radially in another direction on the thrust rod, in such a way that each package carrier can be advanced in half the cycle time by half the cycle distance under a given treatment station.

The advantageous structure of the respective package carrier and the support thereof laterally on support rails on which it is slidingly displaced permit the individual package carriers to be decoupled from each other. The described simple conveyor means with the advance projections are capable of advancing the package carriers in each case by an entire cycle distance. If now in accordance with the last-described measure an intermediate stroke projection projects radially from the thrust rod between two advance projections at a different angle, other cycle distances with other cycle times are possible for the same package carrier. Therefore in one and the same process plane the package carriers can be conveyed by way of seven (or fewer) out of eight treatment stations in each case by an entire cycle distance and in one (or more) stations the package carrier can be conveyed twice by half the cycle distance, so that firstly the front row of the open and filled packages passes into a position under the row of sealing tools and in the next step still within the full cycle time (for the filling operation) the next rear row passes into a position under the sealing tools so that both rows of packages can be successively provided with sealed closures in the full cycle time.

A further advantage of the U-shaped recesses in the package carrier of the widths which are adapted to the bottle necks is that bottle bodies of a different format can be accommodated and transported by one and the same package carrier provided only that the outside dimensions of the bottle neck are the same. In many bottles of different formats, the neck dimensions are standardized and are of a fixed structure.

In contrast to the state of the art the package carriers according to the invention are not rigidly interlinked so that they can be flexibly staggered. Almost all package carriers for example can be moved into the first process plane and the arrangement cleaned at the other conveyor portions or almost all package carriers can be moved into the second return plane in order to clean the individual treatment stations from all sides. Portions of the overall conveyor according to the invention can therefore be run empty. The simple and practical way in which the package carriers are held on the carrier rails means that it is possible for them to be replaced in a very short time and using simple tools. That can be necessary under some circumstances for example upon a change in bottle or format.

Loading of the package carriers from both sides, in a preferred embodiment from the front and from the rear, permits loading and transporting of the packages at both sides, in a short time and in a space-saving fashion.

Further advantages, features and possible uses of the present invention will be apparent from the description hereinafter of preferred embodiments with reference to the accompanying drawings in which.

In the embodiments illustrated here the packages which are identified by reference 1 involve plastic bottles, in which respect the packages 1 in bottle form are referred to in the following description of the preferred embodiments as a "bottle". The bottles are carried in package carriers 2. Disposed under a frame 3 which at the same time also forms the upper boundary of a hygiene chamber (not shown in greater detail here) are various treatment stations 4, 5, 6, from left to right for example blowing nozzles for preheating, thereafter spray nozzles in the case of spraying in a sterilizing mixture, thereafter various drying stations, a cutting station, a filling station 6 and the sealing station 5, by means of which the filled bottles are closed. In a preferred embodiment for example which involves sterile packaging of liquid foodstuffs, that closure operation can be effected by sealing on a plastic-coated aluminum foil. It will be seen that all treatment stations 4 and 6 are duplicated, that is to say two rows of bottles are always being treated at the same time, for example filled in the filling station 6, whereas the sealing station 5 is provided with the comparatively expensive sealing tools only singly or in one row.

Figure 1:
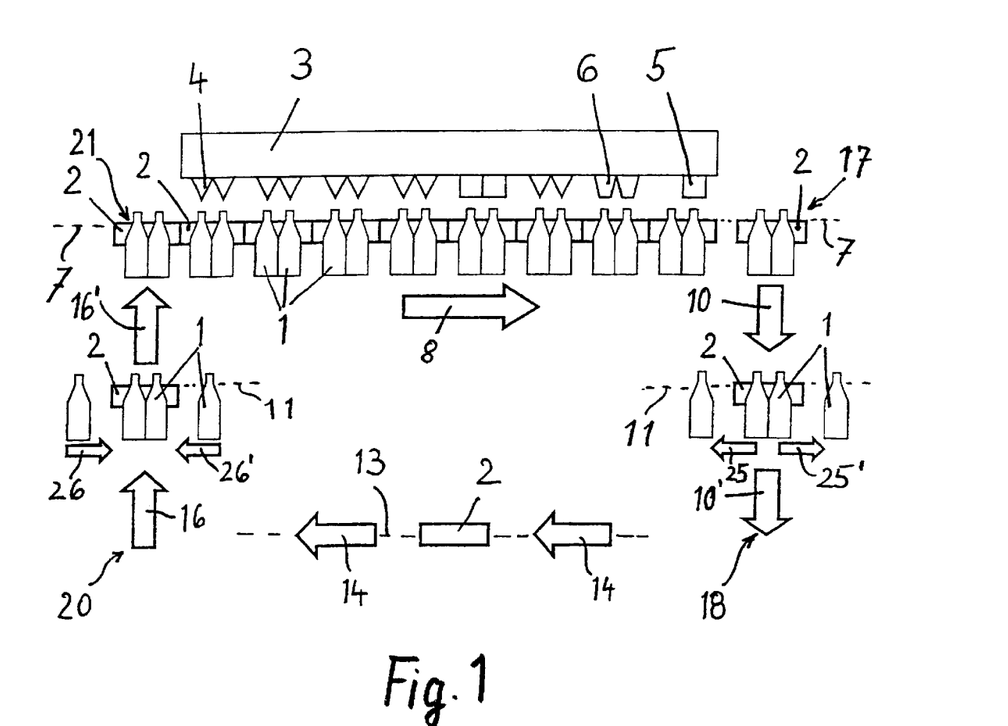
FIG. 1 is a diagrammatic view of the overall conveyor circuit showing the three planes and the four conveyors, FIG. 2 also diagrammatically shows a part of the drive device of the first conveyor in three different operating conditions.

The row of package carriers 2 under the treatment stations 4 through 6 is disposed in the first process plane 7 in which the package carriers 2 and thus the bottles 1 are moved in the first travel direction illustrated by the arrow 8 in FIG. 1, that is to say from left to right in FIG. 1.

Figure 3:
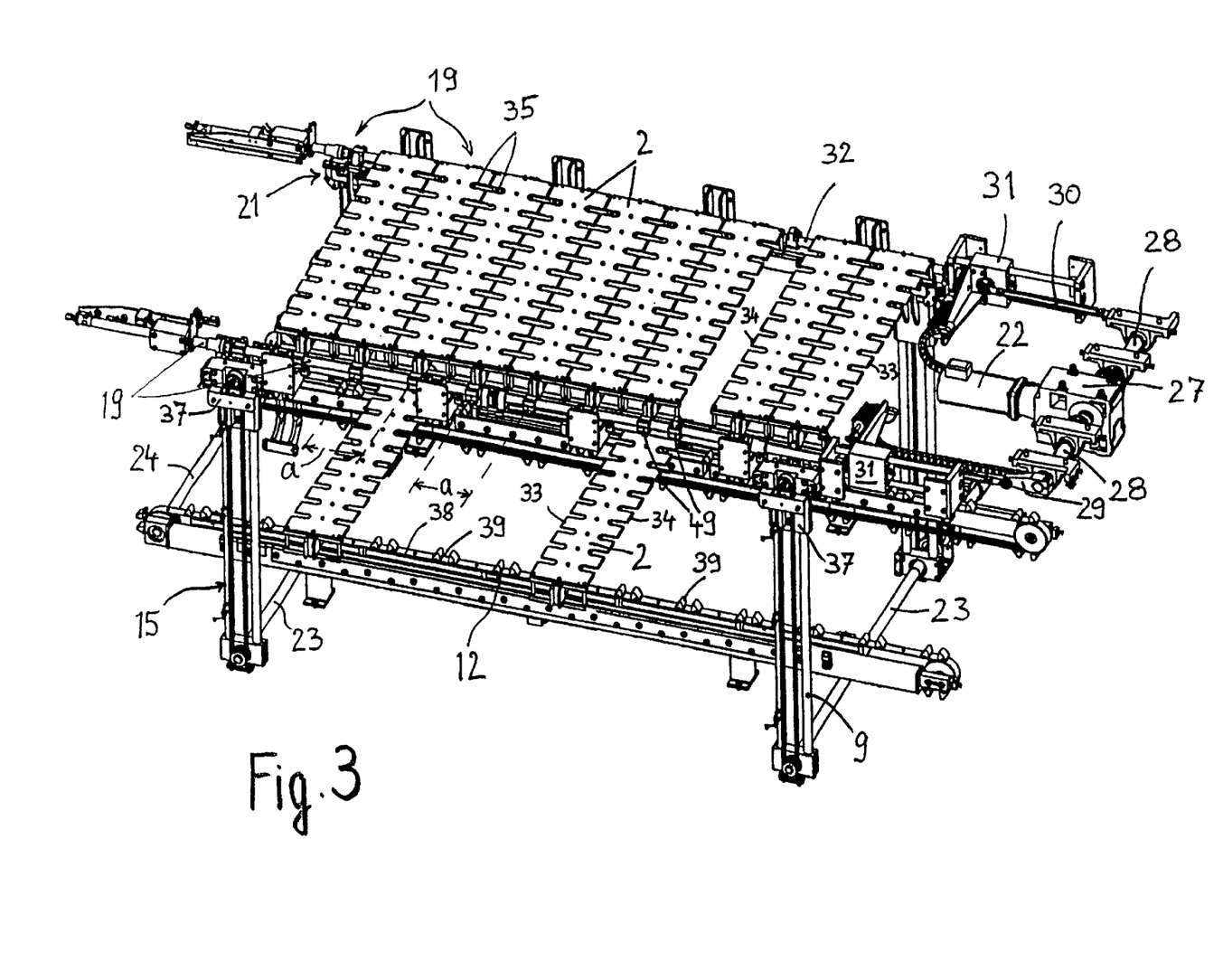
FIG. 3 shows an isometric overall view of the conveyor apparatus.

When the bottles 1 have reached the right-hand discharge end in the first process plane 7, that is to say they are filled and closed, then the package carrier in question is transposed onto the vertically operating second lift conveyor which is identified generally by reference 9 (FIG. 3). In the second lift conveyor the package carriers 2 are lowered as indicated by the arrows 10 and 10' (downwardly in a vertical second travel direction), more specifically initially in the second travel direction 10 to a third loading plane 11 and thereafter in the second travel direction 10' onto the lowermost position where the package carrier 2 is moved by means of the horizontally operating third conveyor 12 (FIG. 3) in the second return plane 13. That movement is indicated by the arrow 14 directed towards the left at the bottom in FIG. 1, which predetermines a third travel direction which is parallel to but opposite to the first travel direction. When, after passing fully through the second return plane 13, the package carrier 2 has arrived at the end of the conveyor at bottom left, it is transposed onto the fourth lift conveyor 15 (FIG. 3) which operates vertically upwardly in the direction of the arrow 16 and 16', which is the first travel direction. That vertical lifting movement of the fourth lift conveyor 15 is effected in two stages. The first stage is represented by the lower arrow 16 and extends as far as the third loading plane 11, which is then followed by the second half of the fourth travel direction 16' until the package carrier 2 has reached the level of the first process plane 7 and is transposed there in order to begin the intermittent movement in the first travel direction 8.

Therefore, as shown in FIGS. 1 and 3, this involves a conveyor circuit which is rectangular as viewed from the side, with a horizontal first travel direction 8 which is followed at the right-hand discharge end by the vertical second travel direction 10 and 10', with the third travel direction 14 from the bottom right end to the bottom left end and from there in the fourth travel direction 16, 16' upwardly and back again to the first process plane 7.

FIG. 1 also shows three broken lines which extend in mutually parallel relationship and which represent the first process plane 7, the second return plane 13 and the third loading plane 11. Above and below the second lift conveyor 9 respectively and also above and below the fourth lift conveyor 15 respectively are mutually superposed ends 17, 18 respectively and 20, 21 respectively. In that respect reference 17 denotes the upward end between the horizontally operating first conveyor 19 which operates along the first travel direction in the first process plane 7, and the second lift conveyor 9. The downwardly disposed end 18 is the end of the second lift conveyor 9 and the beginning of the third conveyor 12 which operates horizontally in the third travel direction 14. The latter ends in the downwardly disposed end 20 of the fourth lift conveyor 15. The vertically upwardly operating fourth lift conveyor 15 finally takes the package carrier 2 back to the first process plane 7, more specifically at the upwardly disposed end 21 of the fourth lift conveyor.

In accordance with the travel directions, there are also the four conveyors which are driven separately from each other, namely the first horizontally extending conveyor 19, the second vertically extending lift conveyor 9, the third horizontally extending conveyor 12 and the fourth, also vertically operating lift conveyor 15.

The first conveyor 19 has the front end 21 and the rear end 17. The front end 21 is above the lower end 20 of the fourth lift conveyor 15 while the end 17 of the first conveyor 19 is above the downwardly disposed end 18 of the second lift conveyor 15. It will be seen that the ends 17 and 18 on the one hand and 21 and 20 on the other hand are disposed one above the other. The first conveyor 19 has a motor 22 as a separate drive, and both the lift conveyor 9 and also the lift conveyor 15 each have a respective separate motor which in FIG. 3 is mounted to the respective rear conveyor and therefore cannot be seen. The rotary force thereof is transmitted by way of the drive shafts 23. The horizontally operating third conveyor 12 in the second return plane 13 is also driven by way of a separate motor which in FIG. 3 is to be notionally envisaged at the bottom left and rear end and is therefore not illustrated. Its rotary force is transmitted to the horizontal conveyor line 12 by way of the drive shaft 24.

It is not just the third loading plane 11 that extends parallel to the first process plane 7, but also the loading directions represented by the arrows 25, 25' and 26, 26'. The means for loading and unloading are not shown in the drawings. It is however easily possible to envisage sliders which are mounted on oscillatingly reciprocatably movable rods and with which an entire row of bottles is moved simultaneously for unloading in the directions 25 towards the right and left and for loading in the direction 26 from right and from left into the center.

In operation of the conveyor the movement of the package carriers 2 takes place approximately as shown in FIGS. 1 and 3 in such a way that most of the package carriers 2 are disposed in the first process plane 7 and only one or two package carriers are for example in the return. The motor 22 (FIG. 3) drives a respective shaft by way of a transmission 27 from the center towards both sides so that an oscillatingly reciprocating movement of a slide 31 is produced on each side by way of a crank 29 and a connecting rod 30 so that on each side a thrust rod 32 is moved in the first travel direction 8 and conversely in the opposite travel direction. That provides for the intermittent movement of the individual package carriers 2 by a respective cycle length, in particular in the movement from one treatment station 4 to the next and so forth as far as the filling station 6. From there on the arrangement involves a two-stage movement towards the sealing station 5, as is described hereinafter.

Figure 6:
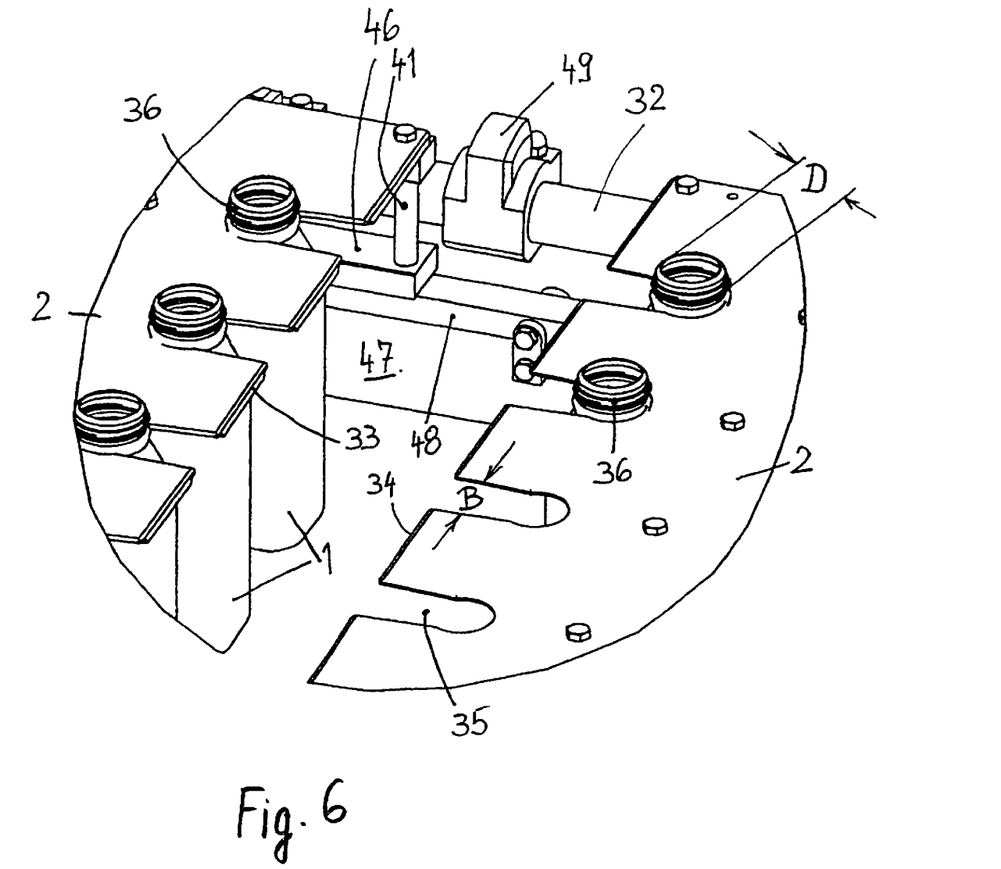
FIG. 6 is a broken-away view on an enlarged scale of two successive package carriers which are partially fitted with packages in the form of bottles, showing the thrust rod with advance projections as the drive device.
Figure 7:
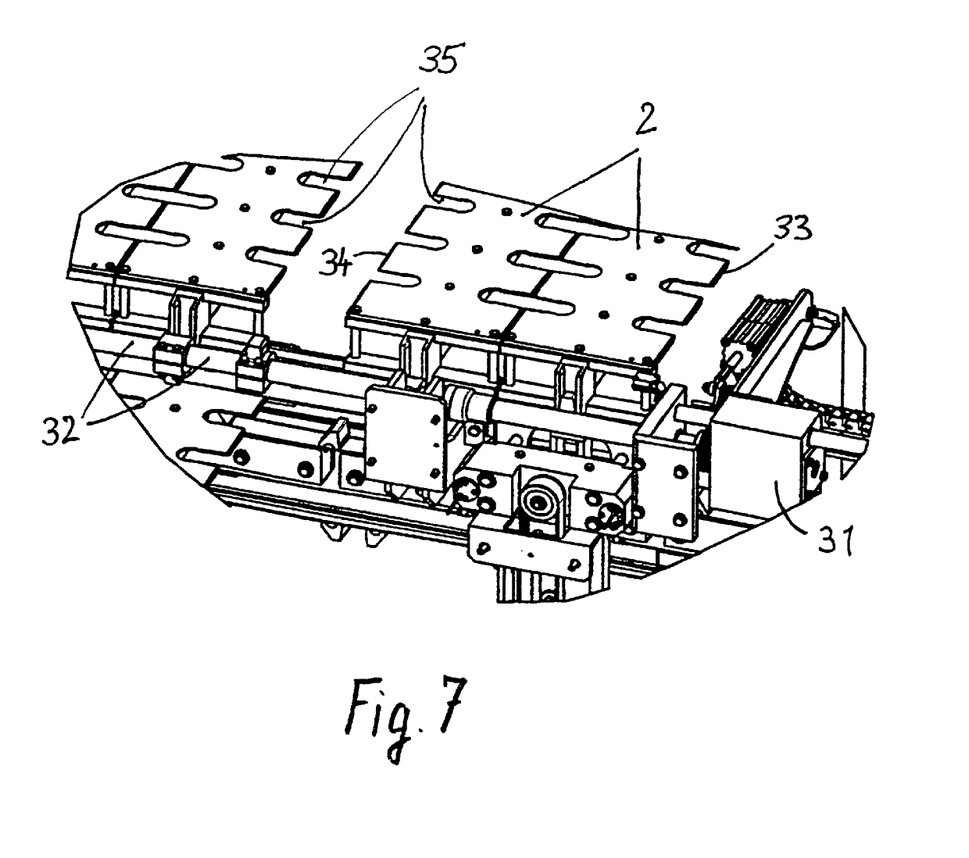
FIG. 7 shows a broken-away individual view corresponding to the top right end of the conveyor apparatus illustrated in FIG. 3, where a package carrier is transferred from the upper first process plane to the second vertically operating lift conveyor.

In the preferred embodiment illustrated here, each package carrier 2 is in the form of an elongate bar extending transversely with respect to the first travel direction 8 and is in the form of a sheet metal member. Extending from the front side 33 of the package carrier 2 are U-shaped recesses 35 which are open outwardly towards that side 33. A row of rearwardly open recesses 35 also extends from the diametrally oppositely disposed rear side 34 of the package carrier 2—being of course reversed in relation to the recesses on the front side 33. As the packages 1 here involve bottles with a neck 36 arranged at the opening thereof, the width B (FIG. 4) is so matched to the outside diameter D (FIG. 6) that the bottle can be moved into and held in the recess 35 with its neck 36 which for example has a male screwthread. That holding action is independent of the configuration of the bottle in the lower region, whether it is long, round, angular, short, large or small. The second lift conveyor 9 and the fourth lift conveyor 15 operate with vertically driven slides 37 which come into engagement on both sides with the respective package carriers 2 and lower them from the first process plane 7 into the second return plane 13 (lift conveyor 9) or vice-versa (lift conveyor 15). The third horizontally operating conveyor 12 operates with an endless belt 38 with pockets 39 provided thereon, in which the package carriers 2 are vertically inserted.

Figures 4, 5:
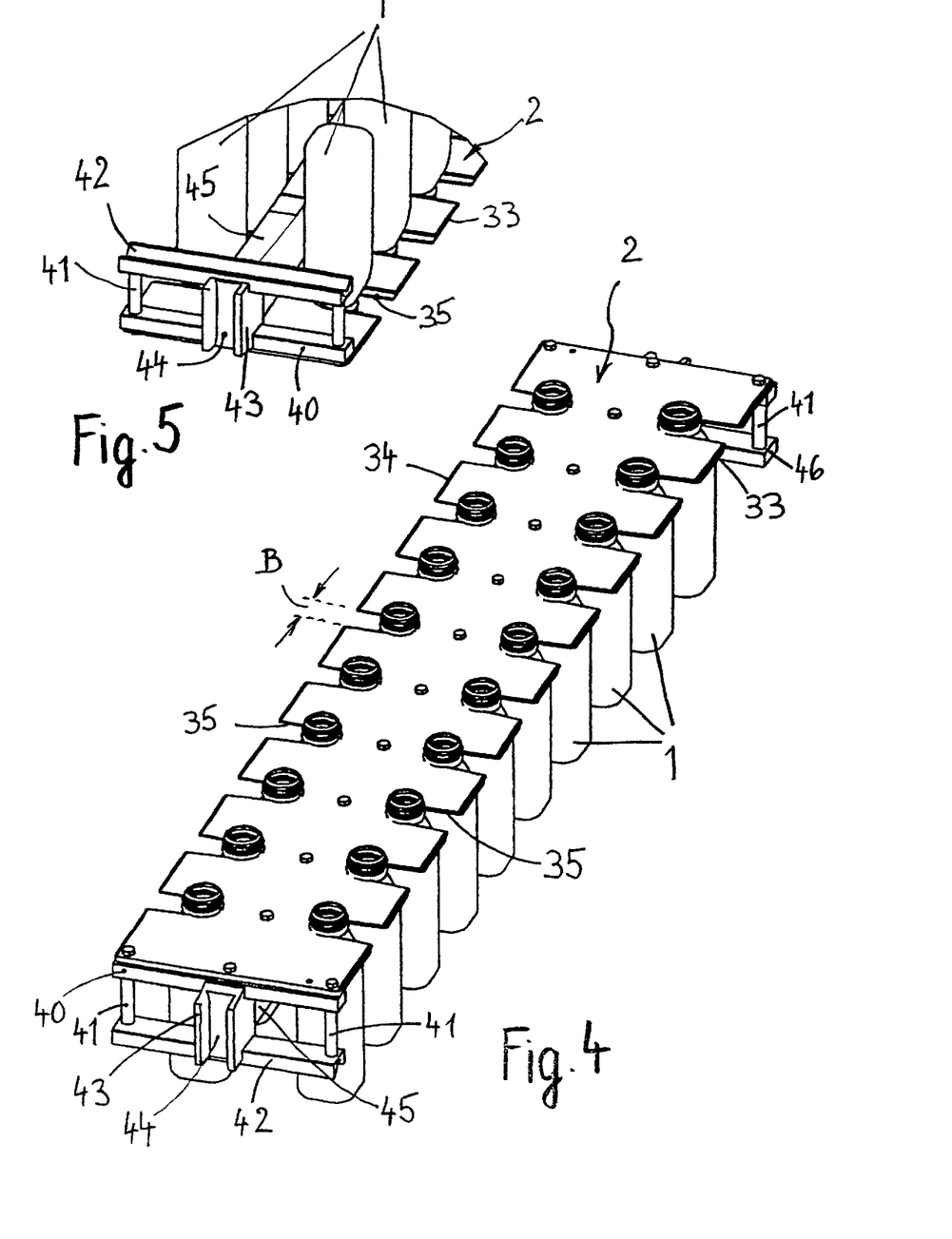
FIG. 4 shows an isometric perspective plan view of the package carrier with inserted plastic bottles as the packages.
FIG. 5 shows a broken-away partial view of the left front lower end of the package carrier of FIG. 4, viewing from below upwardly.

At both transverse ends (FIGS. 4 and 5) of the package carrier 2 it is provided with a carrier 40 which by way of two supports 41 holds a downwardly open counterpart rail 42 of V-shaped cross-section. Disposed between that counterpart rail 42 and the carrier 40 in the middle is an advance block 43 in which there is provided a laterally outwardly open locking groove 44. The advance block 43 can be the lateral end of a stiffening carrier 45 which is in the form of a hollow profile member. The stiffening carrier 45 extends centrally transversely over the whole of the bar-shaped package carrier 2 so that the latter does not flex excessively, even when filled bottles are hung therein. It is desirable if that end which in FIGS. 4 and 5 is at the opposite side of the package carrier 2 carries a flat support rail 46 by way of supports 41 in order to permit any tolerances in the transverse direction (longitudinal direction of the bar) by virtue of lateral displacement on a carrier rail 47. That carrier rail is moreover provided at the top with a flat guide 48 of plastic material so that the flat support rail 46 can be held and guided with as little friction as possible.

Advance projections 49 are mounted on each thrust rod 32 at spacings a (see FIGS. 2 and 3) projecting radially at a given angle from the thrust rod 32. That spacing a is equal to the center-to-center spacing between two package carriers 2 which have moved into mutually adjacent relationship so that the spacing between the two adjacent locking grooves 44 is also equal to a. In that way, upon a certain rotary movement, the advance projections 49 can move into those locking grooves 44, as is shown for example in condition I in FIG. 2. It can be imagined that the upstanding advance projection 49 in FIG. 6 which is in a rest position is rotated forwardly through 90° when it is opposite a locking groove 44 of a package carrier 2. That described engagement is then achieved.

Figure 2:
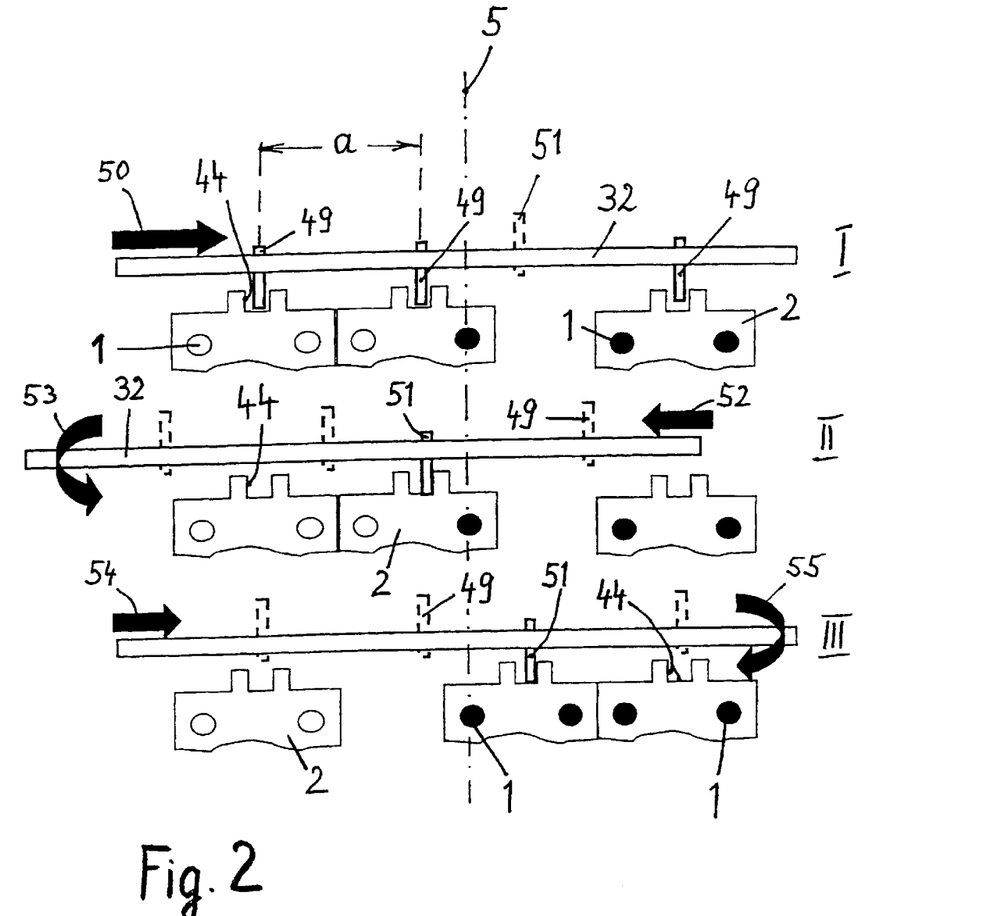

In FIG. 2 the long black arrow in position I, which is identified by reference 50 and which points towards the right in the first travel direction 8, signifies that the thrust rod 32 performs a stroke movement from a left-hand position (not shown) towards the right in the direction of that arrow 50 so that the two package carriers 2 on the left have reached the illustrated position. The dash-dotted line which extends continuously downwardly through all three positions I, II and III of the thrust rod is the position in which the sealing station 5 is disposed stationarily under the frame 3. Each package carrier 2 is shown broken away in FIG. 2, on its side opposite to the groove 44. It will be appreciated that it is also in the form of a long bar, as described with reference to FIG. 4. The circles diagrammatically denote that two rows of bottle necks 36 are carried on each package carrier 2. The three circles which are shown furthest at the left are white while the right-hand circle is under the position of the sealing station 5 and is black. In this diagrammatic drawing, that means that the foremost bottles are closed by the sealing effect. As indicated by the white circles, the bottle necks 36 therebehind are still open. The spacing a corresponds to the total cycle distance. In contrast in the travel direction 8 the spacing of two bottle necks 36 from each other is equal to half the cycle distance. As only one row of sealing stations 5 extends over the entire machine, the first white circle which is to the left of the black circle, in an intermediate stroke movement, has to be conveyed by only half the cycle length only as far as the dash-dotted line.

On the one hand that it is implemented only by decoupling the package carriers from each other, as can be seen from this description. On the other hand that shorter intermediate stroke movement is produced by means of an intermediate stroke projection 51. The latter is disposed between two advance projections 49 which project radially in the same direction from the thrust rod 32, radially projecting for example diametrally in the opposite direction from the thrust rod 32. If, starting from the basic position I in FIG. 2, the thrust rod 32 is rotated through 90°, it will be seen that then both the advance projections 49 and also the intermediate stroke projection 51 come out of engagement or the latter, in spite of the rotation through 90°, still does not come into engagement, respectively. In that position the thrust rod 32 can be pushed passed the stationary package carriers 2 without touching same. It is assumed that half a stroke movement in opposite relationship to the first travel direction is effected as indicated by the short black arrow 52 in position II and all projections move towards the left by that length=a/2. Now the thrust rod 32 is rotated through a further 90° in the same direction as previously so that now only the intermediate stroke projection 51 as shown in FIG. 2, position II, comes into engagement in a locking groove 44 while the other advance projections 49 remain disengaged. These rotary movements of the thrust rod 32 are shown by the curved arrow 53 illustrated at the left.

When the thrust rod 32 is now displaced back again towards the right in the direction of the arrow 54 by half the cycle stroke, then the intermediate stroke projection 51 conveys the single package carrier 2 towards the right by half the cycle stroke a/2 so that the package carriers 2 are in the position III shown in FIG. 2. The black dots show which bottle necks 36 have already been sealed. As viewed from right to left, the fourth bottle neck can now be sealed, because it also comes to a position under the dash-dotted line and thus the sealing station 5. That is the condition of the position III in FIG. 2.

Operation is repeated in a similar manner insofar as, in accordance with the curved arrow 55, the thrust rod 32 is again moved through 90° in such a way that all projections are out of engagement from the locking grooves 44. The thrust rod 32 can now be displaced towards the left in opposite relationship to the first travel direction 8 by a full cycle length so that two advance projections 49 come into engagement with locking grooves 44 (not shown in FIG. 2). When now the thrust rod 32 is displaced towards the right in the direction of the arrow 50 by the full cycle length a, that restores the condition of position I. From then on the operating procedure is repeated.

LIST OF REFERENCES 1 package, bottle
2 package carrier
3 frame
4, 5, 6 treatment stations
5 sealing station
6 filling station
7 first process plane
8 first travel direction
9 second lift conveyor
10, 10' second travel direction
11 third loading plane
12 third conveyor
13 second return plane
14 third travel direction
15 fourth lift conveyor
16, 16' fourth travel direction
17 upward end of the second lift conveyor 9
18 downward end of the second lift conveyor 9
19 first conveyor
20 downward end of the fourth lift conveyor 15
21 upward end of the fourth lift conveyor 15
22 motor, drive
23, 24 drive shafts
25, 25' loading direction (unloading)
26, 26' loading direction (loading)
27 transmission
28 shaft
29 crank
30 connecting rod
31 slide
32 thrust rod
33 front side of the package carrier
34 rear side of the package carrier
35 recess
36 bottle neck
37 slide
38 endless belt
39 pocket
40 carrier
41 support
42 counterpart rail
43 advance block
44 locking groove
45 stiffening carrier
46 flat support rail
47 carrier rail
48 flat guide
49 advance projection
50 arrow in first travel direction
51 intermediate stroke projection
52 arrow opposite first travel direction
53 arrow for rotation
54 arrow for first travel direction
55 arrow for rotation
I operating condition of the first conveyor 19: normal stroke
II operating condition of the first conveyor 19: beginning of the intermediate stroke
III operating condition of the first conveyor 19: end of the intermediate stroke
a spacing of the advance projections
B width of the recesses 35
D outside diameter of the bottle neck

What is claimed is:

1. Apparatus for intermittently conveying packages (1) which are conveyed in a first travel direction (8) in package carriers (2) on a first process plane (7) in positions beneath various treatment stations (4, 5, 6) and back on a second return plane (13) in a third travel direction (14) parallel to the first travel direction (8), forming a conveyor circuit, wherein respective mutually superposed ends (17, 18; 21, 20) of a substantially horizontally extending first conveyor (19) in the first process plane (7) and a substantially horizontally extending third conveyor (12) in the second return plane (13) are interconnected by substantially vertically operating second and fourth lift conveyors (9, 15) to form the conveyor circuit;

each conveyor (19, 9, 12, 15) has a separate drive means having separate drives (22–24);

a third loading plane (11) is arranged between the first process plane (7) and the second return plane (13);

the three planes (7, 11, 13) are arranged substantially horizontally;

each package carrier (2) is of a substantially flat structure which is held in a substantially horizontal position in the conveyor circuit; and means are provided in the third loading plane (11) for transporting the packages (1) in a loading or unloading direction (25, 25', 26, 26') which is parallel to the first travel direction (8) of the packages (1).

2. Apparatus as set forth in claim 1 wherein the means in the third loading plane load the packages into the package carriers (2) in a loading direction.

3. Apparatus as set forth in claim 1 wherein the means in the third loading plane unload the packages (1) from the package carriers (2) in an unloading direction (25).

4. Apparatus as set forth in claim 2 wherein the means in the third loading plane (11) both load and unload packages into and from the package carriers (2) in the loading or unloading direction.

5. Apparatus as set forth in claim 1 wherein total conveyor time of the lift conveyors (9, 15) is substantially equal to cycle time of the first conveyor (19) in the first process plane (7) and that time for loading and unloading is approximately equal to transport time within cycle time of the first conveyor (19).

6. Apparatus as set forth in claim 1 wherein the package carrier (2) on two diametrally opposite sides (33, 34) has U-shaped, outwardly open recesses (35) which are oriented in the first travel direction (8) of the first conveyor (19).

7. Apparatus as set forth in claim 5 wherein the package carrier (2) on two diametrally opposite sides (33, 34) has U-shaped, outwardly open recesses (35) which are oriented in the first travel direction (8) of the first conveyor (19).

8. Apparatus as set forth in claim 6 wherein the package carrier (2) is in the configuration of an elongate bar extending transversely with respect to the first travel direction (8), in such a way that the recesses (35) come to lie in paired mutually juxtaposed relationship.

9. Apparatus as set forth in claim 7 wherein the package carrier (2) is in the configuration of an elongate bar extending transversely with respect to the first travel direction (8), in such a way that the recesses (35) come to lie in paired mutually juxtaposed relationship.

10. Apparatus as set forth in claim 6 wherein the package carrier (2) for holding bottles (1) is a bar-shaped sheet member with pairs, which are arranged in mutually juxtaposed relationship transversely with respect to the first travel direction (8), of U-shaped recesses (35) which face away from each other and a width (B) of which corresponds to outside diameter (D) of a bottle neck (36) of bottle (1).

11. Apparatus as set forth in claim 7 wherein the package carrier (2) for holding bottles (1) is a bar-shaped sheet member with pairs, which are arranged in mutually juxtaposed relationship transversely with respect to the first travel direction (8), of U-shaped recesses (35) which face away from each other and a width (B) of which corresponds to outside diameter (D) of a bottle neck (36) of bottle (1).

12. Apparatus as set forth in claim 1 wherein drive means (22, 27–32) for first conveyor (19) in the first process plane (7) has at least one thrust rod (32) which extends in the first travel direction (8) and which is pivotable and which is displaceable forwardly and back in the first travel direction (8) and in opposite relationship thereto and on which are fixed at a spacing (a) from each other advance projections (49) which can be brought into engagement with locking grooves (44) on the package carrier (2).

13. Apparatus as set forth in claim 5 wherein drive means (22, 27–32) for first conveyor (19) in the first process plane (7) has at least one thrust rod (32) which extends in the first travel direction (8) and which is pivotable and which is displaceable forwardly and back in the first travel direction (8) and in opposite relationship thereto and on which are fixed at a spacing (a) from each other advance projections (49) which can be brought into engagement with locking grooves (44) on the package carrier (2).

14. Apparatus as set forth in claim 6 wherein drive means (22, 27–32) for first conveyor (19) in the first process plane (7) has at least one thrust rod (32) which extends in the first travel direction (8) and which is pivotable and which is displaceable forwardly and back in the first travel direction (8) and in opposite relationship thereto and on which are fixed at a spacing (a) from each other advance projections (49) which can be brought into engagement with locking grooves (44) on the package carrier (2).

15. Apparatus as set forth in claim 7 wherein drive means (22, 27–32) for first conveyor (19) in the first process plane (7) has at least one thrust rod (32) which extends in the first travel direction (8) and which is pivotable and which is displaceable forwardly and back in the first travel direction (8) and in opposite relationship thereto and on which are fixed at a spacing (a) from each other advance projections (49) which can be brought into engagement with locking grooves (44) on the package carrier (2).

16. Apparatus as set forth in claim 8 wherein drive means (22, 27–32) for first conveyor (19) in the first process plane (7) has at least one thrust rod (32) which extends in the first travel direction (8) and which is pivotable and which is displaceable forwardly and back in the first travel direction (8) and in opposite relationship thereto and on which are fixed at a spacing (a) from each other advance projections (49) which can be brought into engagement with locking grooves (44) on the package carrier (2).

17. Apparatus as set forth in claim 10 wherein drive means (22, 27–32) for first conveyor (19) in the first process plane (7) has at least one thrust rod (32) which extends in the first travel direction (8) and which is pivotable and which is displaceable forwardly and back in the first travel direction (8) and in opposite relationship thereto and on which are fixed at a spacing (a) from each other advance projections (49) which can be brought into engagement with locking grooves (44) on the package carrier (2).

18. Apparatus as set forth in claim 12 wherein between two advance projections (49) which project radially in the same direction from the thrust rod (32), an intermediate stroke projection (51) is fixed on the thrust rod (32) projecting radially in a different direction, in such a way that each package carrier (2) can be advanced in half the cycle time by half the cycle distance (a/2) under a given treatment station (5).

19. Apparatus as set forth in claim 13 wherein between two advance projections (49) which project radially in the same direction from the thrust rod (32), an intermediate stroke projection (51) is fixed on the thrust rod (32) projecting radially in a different direction, in such a way that each package carrier (2) can be advanced in half the cycle time by half the cycle distance (a/2) under a given treatment station (5).

20. Apparatus as set forth in claim 14 wherein between two advance projections (49) which project radially in the same direction from the thrust rod (32), an intermediate stroke projection (51) is fixed on the thrust rod (32) projecting radially in a different direction, in such & way that each package carrier (2) can be advanced in half the cycle time by half the cycle distance (a/2) under a given treatment station (5).

21. Apparatus as set forth in claim 15 wherein between two advance projections (49) which project radially in the same direction from the thrust rod (32), an intermediate stroke projection (51) is fixed on the thrust rod (32) projecting radially in a different direction, in such a way that each package carrier (2) can be advanced in half the cycle time by half the cycle distance (a/2) under a given treatment station (5).

22. Apparatus as set forth in claim 16 wherein between two advance projections (49) which project radially in the same direction from the thrust rod (32), an intermediate stroke projection (51) is fixed on the thrust rod (32) projecting radially in a different direction, in such a way that each package carrier (2) can be advanced in half the cycle time by half the cycle distance (a/2) under a given treatment station (5).

23. Apparatus as set forth in claim 17 wherein between two advance projections (49) which project radially in the same direction from the thrust rod (32), an intermediate stroke projection (51) is fixed on the thrust rod (32) projecting radially in a different direction, in such a way that each package carrier (2) can be advanced in half the cycle time by half the cycle distance (a/2) under a given treatment station (5).

24. Apparatus as set forth in claim 1 wherein as viewed from a side beginning from an upstream left end, it comprises a rectangular conveyor circuit including a horizontal first section that moves in the first travel direction (8) to a right discharge end, which first travel direction (8) is followed at the right discharge end by a vertical second section that moves in a second downward travel direction (10, 10') to a bottom right end, a third horizontal section that moves in the third travel direction (14) from the bottom right end to a bottom left end and a forth section that moves from in a fourth travel direction (16, 16') from the bottom left end upwardly and back again to the upstream left end.

* * * * *